May 25, 1926.  
C. M. DRINKWATER  
FOOD CONVEYER  
Filed Jan. 17, 1924  
1,585,834  
3 Sheets-Sheet 2

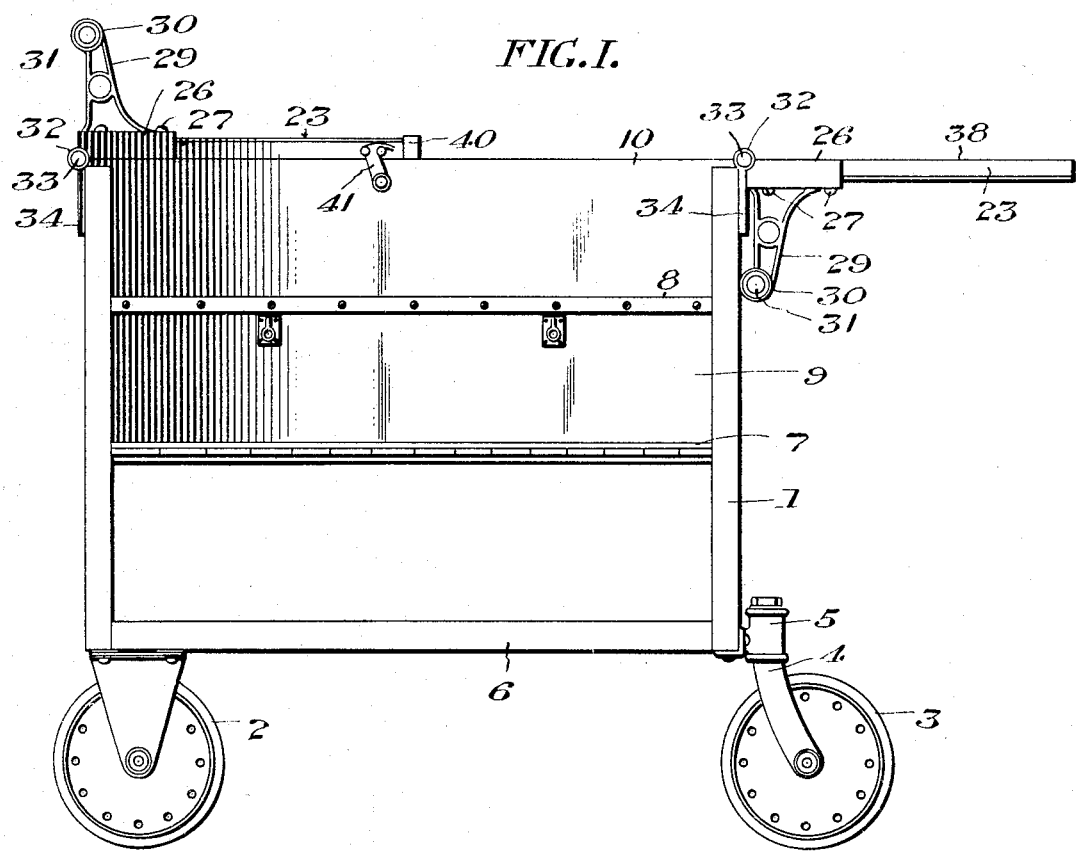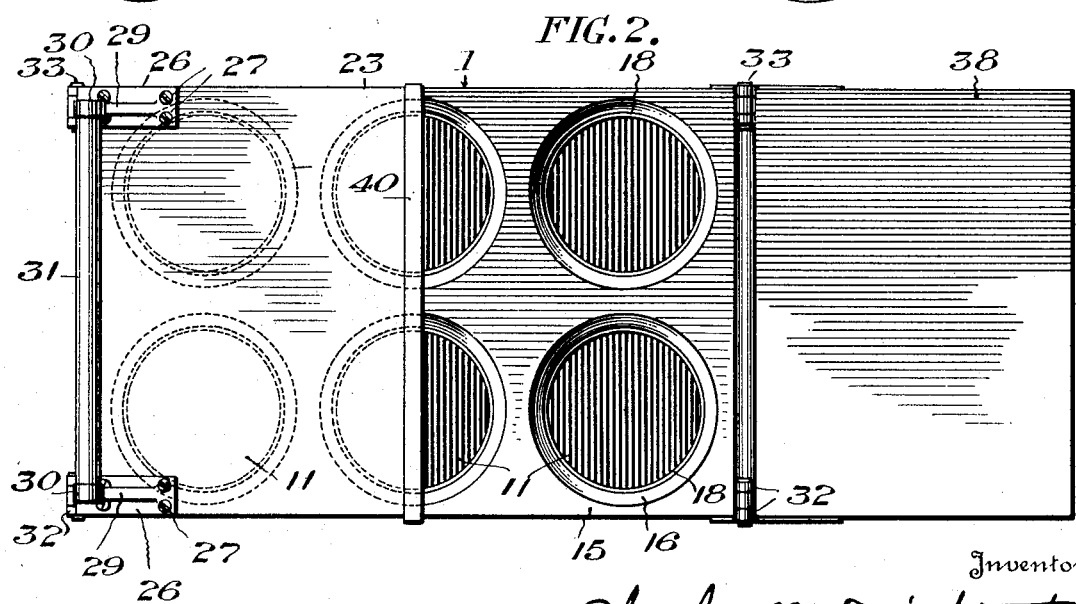

Inventor  
Charles M. Drinkwater  
By William W. Deane  
his Attorney

May 25, 1926.
C. M. DRINKWATER
FOOD CONVEYER
Filed Jan. 17, 1924     3 Sheets-Sheet 3
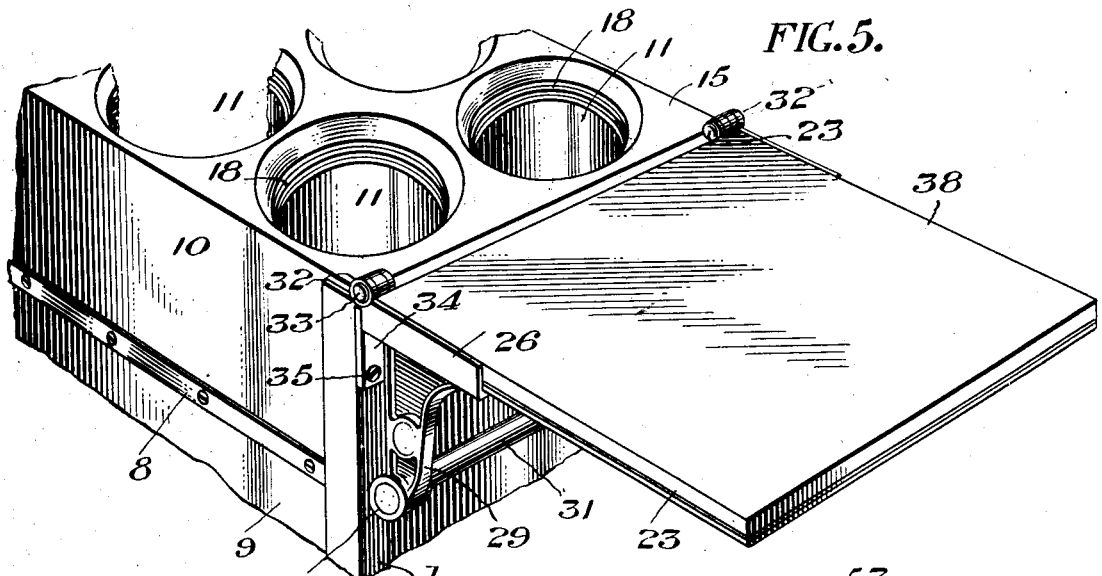
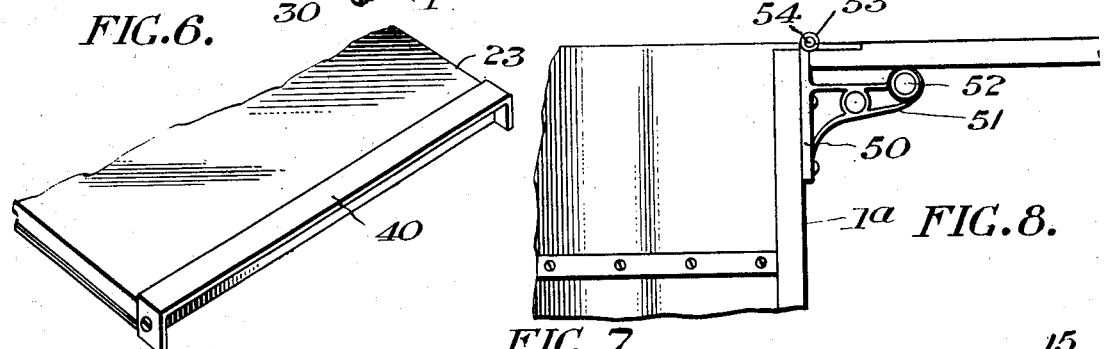
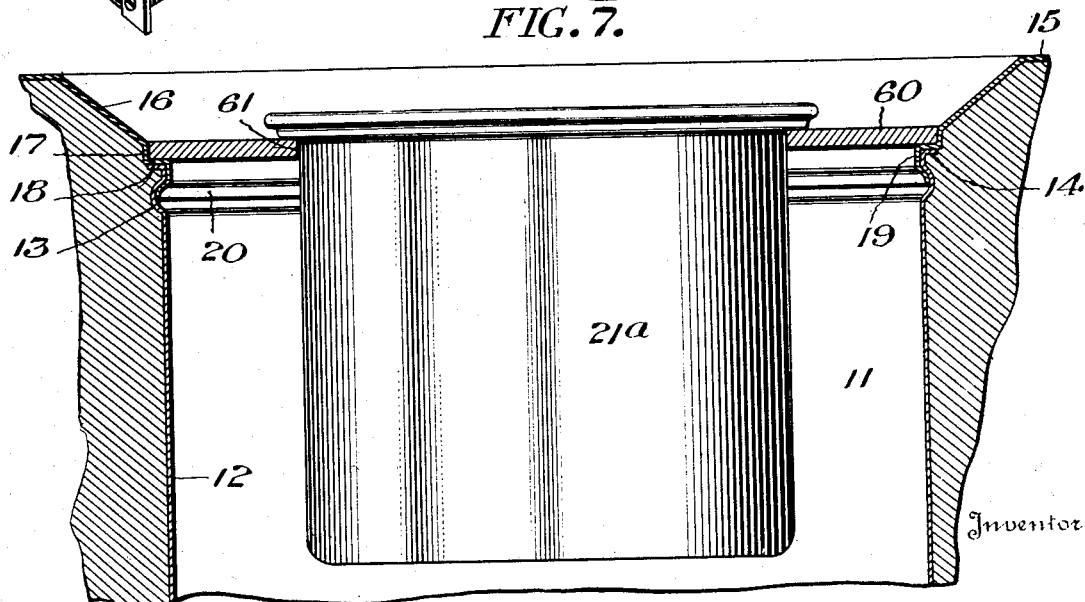

Patented May 25, 1926.

1,585,834

UNITED STATES PATENT OFFICE.

CHARLES M. DRINKWATER, OF PELHAM, NEW YORK.

FOOD CONVEYER.

Application filed January 17, 1924. Serial No. 686,885.

This invention relates to improvements in vehicles, and more particularly to a novel food conveyer.

The primary object of this invention is to provide a wheel supported food conveyer having one or more insulated wells adapted to receive food and to maintain the food in heated or cooled condition for a considerable length of time, so that the conveyer may be used to transport food from the kitchen or the like to a dining room and will maintain the food in proper condition until the same is served to the user.

Another object of the present invention is to provide a cover or covers for the well or wells which may be swung outwardly and form a serving table when it is desired to serve food from the wells.

Another object of the invention is to provide brackets which function as supports for handles to be used by the operator in pushing or pulling the conveyer from place to place and which also functions as supporting members for the covers when the covers are swung outwardly to provide serving tables or platforms.

Another object of the invention is to provide a bracket which forms a handle support, a cover support and a hinge element.

A further object of the invention is to provide wells constructed to facilitate the withdrawal of food containers by the operator and for this purpose each well has its upper end flared so as to permit the operator to grasp the upper end of the container and withdraw the same from the well.

A still further object is to furnish a well having an internal shoulder adapted to receive a pot ring or the like, so that vessels or food containers of various sizes may be supported within the well by the pot ring.

With the foregoing objects outlined and with other objects in view which will appear as the description proceeds, the invention consists in the novel features hereinafter described in detail, illustrated in the accompanying drawings, and more particularly pointed out in the appended claims.

Referring to the drawings:

Figure 1 is a side view of the improved conveyer with one of the covers or lid sections opened or swung outwardly to form a serving platform.

Fig. 2 is a top plan view of the same.

Fig. 5 is a detail perspective view of one end portion of the conveyer and illustrating clearly the manner in which one of the lid sections forms a serving platform.

Fig. 6 is a detail perspective view of one end of one of the covers.

Fig. 7 is a vertical sectional view of one of the wells provided with a pot ring supporting a food container of relatively small size.

Fig. 8 is a detail view of a modified form of bracket, which it will be noted is secured to the body of the conveyer instead of to the cover.

Figure 3:
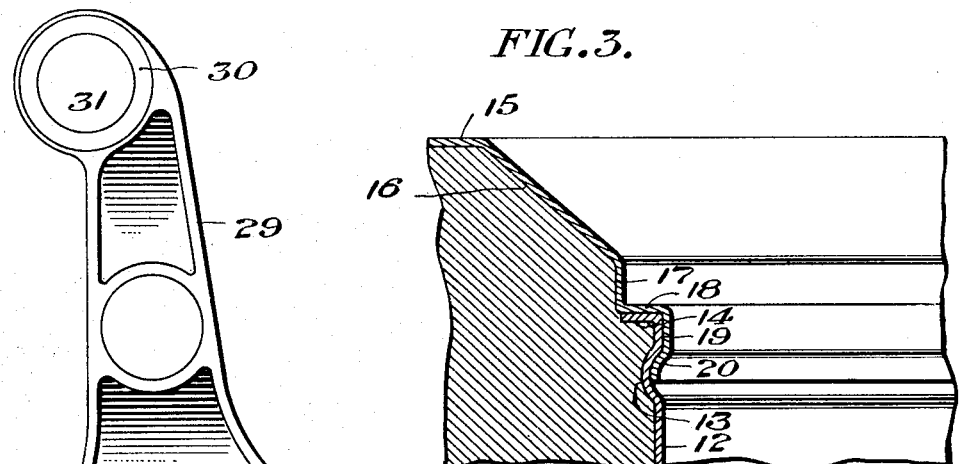
Fig. 3 is a detail sectional view of a portion of one of the wells and illustrating the manner in which the metal sections forming the wall of the same are connected together.

In the drawings, 1 designates a body or frame mounted on supporting wheels 2 and 3, the latter being connected to forks 4 swiveled in bearings 5. The body or frame 1 has three shelves 6, 7 and 8, the shelf 6 being open all around and being adapted to support food trays, napkins, cutlery and the like. The shelf 7 is enclosed and has a hinged cover or door 9. This forms a compartment to receive the dishes.

Figure 4:
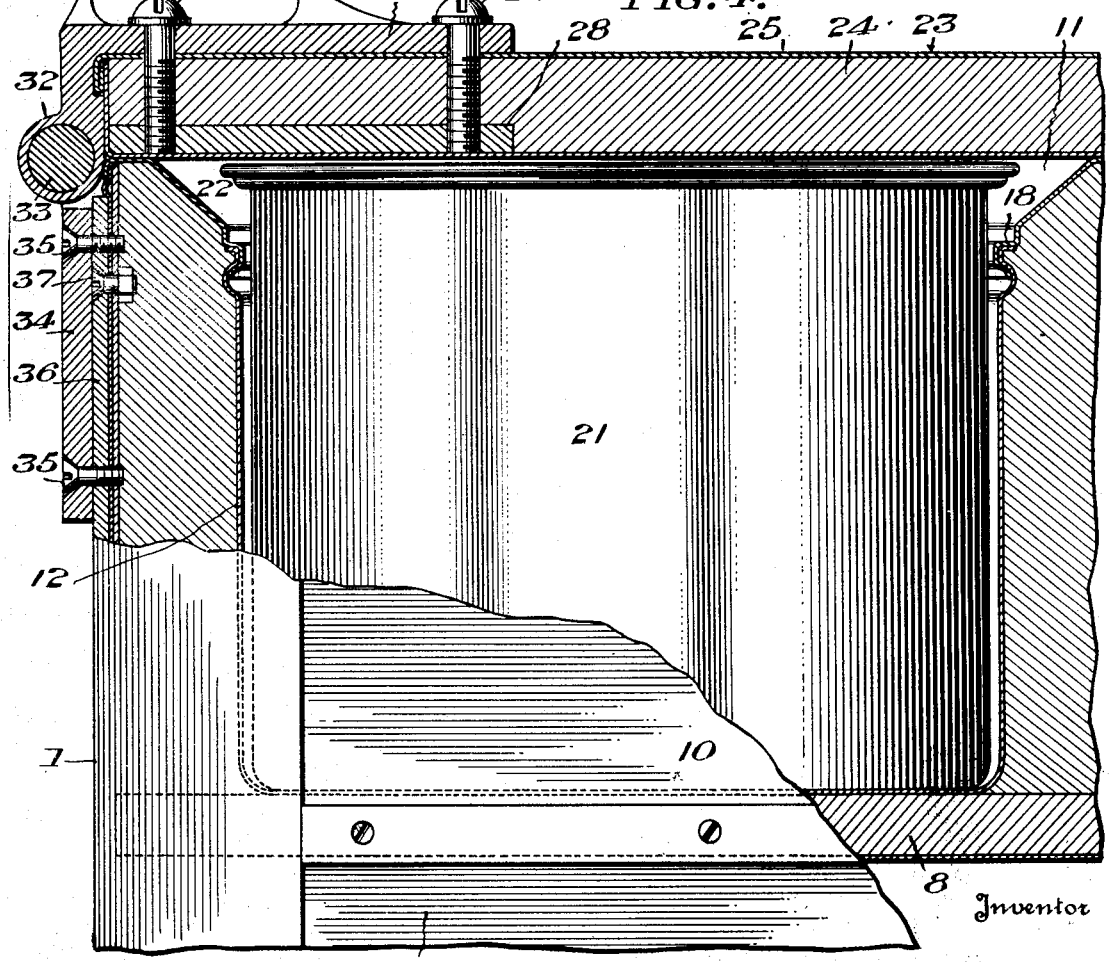
Fig. 4 is a detail view partly in section illustrating one of the wells and one of the handle brackets.

The shelf 8 forms the bottom of an insulated well compartment 10. This compartment as best shown in Fig. 4 is formed of some suitable insulating material and contains a number of wells 11. Each well preferably has a lining of metal 12 and as shown in Fig. 3, the upper end of this lining is bulged outwardly at 13 to form an annular outwardly extending bead, and immediately above this bulged portion, the upper end of the lining is bent sharply outwardly to form a shoulder or flange 14. The upper surface of the well is formed by a sheet metal plate 15, which is depressed at spaced points to form downwardly extending conical portions 16, each merging at its lower end into a cylindrical portion 17. This cylindrical portion in turn merges into a horizontal shoulder 18 which is integral with a depending cylindrical portion 19, the lower edge of which is pressed outwardly at 20 to lock against the inner surface of the bead 13. Owing to this construction the sheet metal lining or surfacing material will be securely locked in position and will have a minimum number of seams, whereby the device may be maintained in sanitary condition. Each well is adapted to receive a food container or vessel 21, and the upper end of this food container will project above the shoulder 18, and the conical portion 16 will form a flared mouth so that the operator may insert his fingers in the space 22 for the purpose of lifting a food container from the well.

It will be observed from Figs. 2 and 5 that each conveyer preferably has a number of wells 11 and some of these wells may receive vessels containing heated foods while others may receive receptacles containing cold foods, and the wells being insulated from each other will maintain these foods in their heated or cooled state for a considerable period of time.

The mouths of the wells may be closed by covers 23, each of which preferably consists of a body of insulating material 24 enclosed within a sheet metal shell 25. As shown in Figs. 1, 2, 4 and 5, each cover is provided with a plurality of angular brackets 26 connected by screws 27 to plates 28 embedded in the covers. Each bracket has an outwardly extending arm 29 terminating in a ring 30 to receive a handle bar 31. Each bracket also has eyes 32 to receive a hinge pintle 33, which connects the bracket to a hinge member 34 secured by screws 35 to a supporting plate 36. The supporting plate is connected to the well compartment by one or more bolts 37.

With this construction, when the covers are closed, the handle bars 31 will be arranged above the covers and the operator may use these handle bars in pushing or pulling the conveyer from place to place. When, however, either cover is swung outwardly about the hinge pintles 33, 180°, the brackets connected to the cover will move with the latter and form a support, so that the lower surface of the cover will now form the upper surface of a platform or serving table 38.

From Figs. 1, 2 and 6, it may be seen that the end of one cover is provided with an outwardly extending flange 40 which is adapted to clamp over the end of the other cover when the covers are in closed position, and due to this construction a single latch element 41 may be employed to maintain both covers in closed position.

Instead of connecting the brackets to the covers, each bracket may be secured to the ends of the frame 1ª as shown in Fig. 8, and in this construction each bracket consists of a vertical member 50 carrying an outwardly extending arm 51 adapted to support the handle bar 52. In this case the upper end of the bracket has eyes 53 to receive the hinge pintles 54 of the cover. It will be observed in this case also that each bracket forms a handle bar support, a cover support and a hinge element.

Referring to Fig. 7, it may be seen that each well is constructed to receive vessels of various sizes, and for this purpose pot rings 60 having apertures 61, are provided. Each pot ring will be of the same diameter, that is of the proper diameter to rest on the shoulder 18 of the well but the apertures in the pot rings may be of varying sizes to receive different sized vessels 21ª.

In use, the conveyer in the kitchen is loaded with the different foods to be served and the covers 23 are then swung into closed position and secured by the patch 41. Then the operator grasps one or the other of the handle bars 31 and moves the conveyer to the place where the food is to be served. When the latter place is reached, one or both covers 23 is or are swung outwardly and the dishes in which the food is placed may rest on the covers while the operator is dispensing the food from the containers or receptacles 21.

While I have disclosed in the foregoing the preferable construction of my invention, it is obvious that various changes may be made in the details without departing from the spirit of the invention as expressed in the claims.

What I claim and desire to secure by Letters Patent is:

1. In a food conveyer, a well compartment member, a cover member for the well and a bracket connected to one compartment and a bracket connected to one of said members and forming a support adapted to hold the cover in horizontal position, said bracket being also provided with a hinge element for the cover and a handle bar supporting element.

2. In a food conveyer, a frame member, a well compartment connected to the frame member, a cover member for the well compartment, brackets connected to one of said members and forming hinge elements, other hinge elements connected to the other member and pivotally connected to the hinge elements of the brackets, and a handle bar carried by said brackets, said brackets being arranged to support the cover member in inverted horizontal position when the cover member is opened.

3. A food conveyer including a well having a lining provided at its upper end portion with an outwardly extending annular bead and a shoulder above the bead, a second lining having a flared mouth and having its lower end formed as an annular shouldered hook engaging the inner surface of said bead.

4. In a food conveyer, a wheeled frame, an insulated casing mounted upon the wheeled frame and having a plurality of wells, a pair of covers hinged at their outer ends to the casing and adapted when in the closed position to extend across said wells, a flange secured to the free end of one cover and adapted to extend over the free end of the other cover, a latch connected with the casing and adapted to lock the cover with the flange in the closed position, pairs of brackets secured to the covers near their hinges and extending above the same, said brackets being adapted to engage with the outer wall of the wheeled frame when the covers are shifted to an outer substantially horizontal position and supporting the same in this position, and handle bars extending between the pairs of brackets and attached thereto, said handle bars being arranged above the casing when the covers are closed whereby they may be employed in effecting the longitudinal travel of the wheeled frame.

5. A food conveyer comprising a wheeled frame, an insulated casing mounted thereon and having a plurality of wells, covers hinged at their outer ends to the frame and adapted to extend across the wells when in the closed position, pairs of brackets rigidly attached to the covers and extending outwardly therefrom, said brackets being adapted to contact with the wheeled frame when the covers are shifted to the outer horizontal position for supporting them in this position, and handle bars extending between the pairs of brackets and attached thereto, said handle bars being positioned above the frame when the covers are closed and hence may be conveniently employed in effecting the travel of the wheeled frame.

6. A food conveyer comprising, a wheeled frame, an insulated casing carried thereby and having a plurality of wells, covers hinged at their outer ends with the wheeled frame and adapted to be shifted to an inner position extending over said wells and to be shifted to outer substantially horizontal positions to serve as tables, brackets associated with the covers and serving to limit their outer movement and to support the same in the substantially horizontal position, and handle bars extending between the brackets and attached to their outer ends, said handle bars being adapted to be conveniently employed in effecting the travel of the wheeled frame.

7. In a food conveyer, a well compartment member, a cover member for the well compartment, and a bracket connected to one of said members and forming a support adapted to hold the cover in horizontal position, said bracket being also provided with a hinge element for the cover.

8. A food conveyer comprising, a wheeled frame, an insulated casing member carried thereby and having a plurality of wells, cover members hinged at their outer ends to the casing member and adapted to be shifted to an inner position extending over said wells and to be shifted to outer horizontal positions to serve as tables, and brackets fixed on one of said members and serving to limit the outer movement of one of the cover members and to support the same in horizontal position.

In testimony whereof I affix my signature.

CHARLES M. DRINKWATER.